United States Patent [19]

Affleck

[11] Patent Number: 4,929,128

[45] Date of Patent: May 29, 1990

[54] MASONRY DRILL ASSEMBLY

[76] Inventor: Robert J. Affleck, Box 745, Harrow, Ontario, Canada, N0R 1G0

[21] Appl. No.: 370,826

[22] Filed: Jun. 23, 1989

[51] Int. Cl.$^5$ .................................... B23B 41/02

[52] U.S. Cl. .................................... 408/139; 408/204; 408/207

[58] Field of Search .................... 408/6, 9, 139, 140, 408/204, 207; 192/56 R, 67 R

[56] References Cited

U.S. PATENT DOCUMENTS

| | | | |
|---|---|---|---|
| 820,194 | 5/1906 | Hoffman | 408/139 |
| 1,430,556 | 10/1922 | Jansen | 408/139 |
| 2,432,443 | 12/1947 | Ranney . | |
| 2,860,421 | 11/1958 | Smith . | |
| 3,191,462 | 6/1965 | Plunske . | |
| 3,308,689 | 3/1967 | MacDonald | 408/204 |
| 4,056,152 | 11/1977 | Lacey | 408/204 |
| 4,284,374 | 8/1981 | Senzaki | 408/139 |
| 4,514,115 | 4/1985 | Akashi | 408/139 |
| 4,599,019 | 7/1986 | Ueberall | 408/139 |

FOREIGN PATENT DOCUMENTS

| | | | |
|---|---|---|---|
| 85786 | 10/1921 | Austria | 408/140 |
| 607603 | 9/1948 | United Kingdom | 408/139 |

*Primary Examiner*—Daniel Howell
*Attorney, Agent, or Firm*—Gifford, Groh, Sprinkle, Patmore and Anderson

[57] ABSTRACT

A drill assembly for use with a drill motor having a chuck is provided for drilling large holes in masonry materials. The drill assembly includes a tube having at least one masonry cutting element attached to one end. A rod has one end adapted to be received within and rotatably driven by the chuck of the drill motor while a clutch assembly mechanically connects the other end of the rod to the tube. The clutch assembly is movable between an engaged position and a released position. In its engaged position, the clutch assembly mechanically connects the rod and tube together so that they are rotatably driven in unison with each other by the drill motor. Conversely, in its released position, the clutch assembly allows relative rotational movement between the rod and the tube.

7 Claims, 2 Drawing Sheets

MASONRY DRILL ASSEMBLY

BACKGROUND OF THE INVENTION

I. Field of the Invention

The present invention relates generally to attachments for drills and, more particularly, to a drill assembly for drilling large holes in masonry materials.

II. Description of the Prior Art

There are many applications in which it is necessary to drill a large hole, for example a two inch hole, in masonry materials, such as brick and concrete. Previously, it has been necessary to utilize special equipment in order to drill such holes.

Such special equipment, however, is relatively expensive to purchase. Furthermore, it is economically impractical to purchase such equipment for drilling large holes in masonry materials unless such holes are drilled by the workman on a fairly regular basis. Conversely, such equipment is too expensive to purchase for the workman who only occasionally needs to drill such a hole.

SUMMARY OF THE PRESENT INVENTION

The present invention overcomes the above mentioned disadvantages of the prior art by providing a drill assembly for drilling large holes in masonry materials which can be operated by a standard drill motor.

In brief, the drill assembly of the present invention comprises an elongated tube having at least one cutting element at one end. Preferably, the cutting element comprises a carbide bit and the diameter of the tube equals the diameter of the desired hole in the masonry material.

The drill assembly further includes an elongated rod having one end adapted to be received within the chuck of a standard drill motor so that, upon activation of the drill motor, the drill motor rotatably drives the rod. The other end of the rod is connected by a clutch assembly to the tube.

The clutch assembly is movable between an engaged position and a released position. In its engaged position, the rod and tube are mechanically coupled together so that the rod and tube rotate in unison with each other. Conversely, in its released position, the clutch assembly allows relative rotational movement between the rod and the tube. Consequently, when the clutch assembly is released, the tube can remain stationary despite continued rotation of the rod. This prevents dangerous kickback of the drill in the event that the tube strikes a hard obstruction when drilling the hole.

Since the drill assembly of the present invention is capable for use with a standard drill motor, the present invention eliminates the necessity of purchasing special equipment in order to drill large holes in masonry materials.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
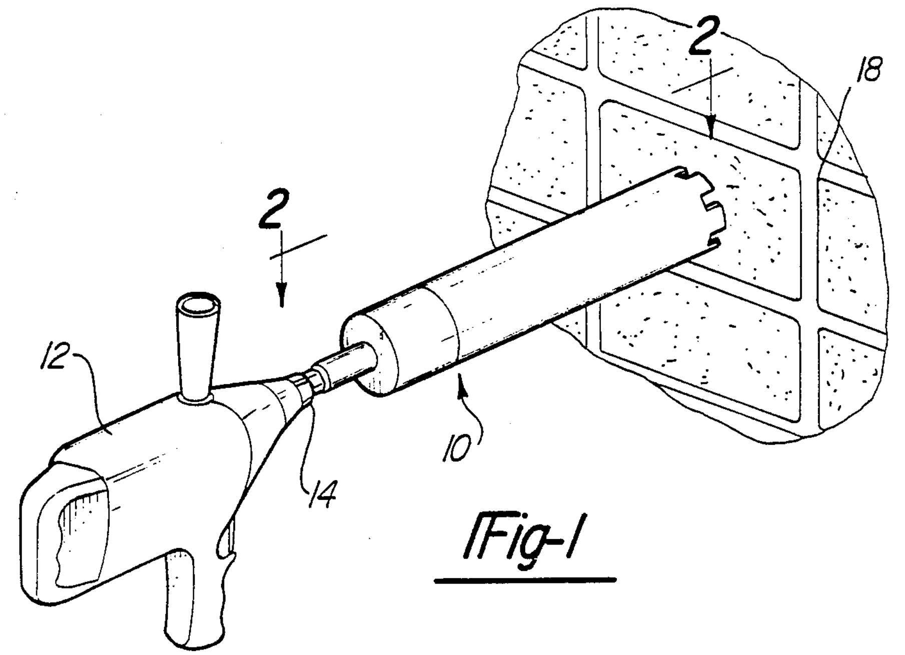
FIG. 1 is a perspective view illustrating a preferred embodiment of the present invention.

With reference first to FIG. 1, a preferred embodiment of the drill assembly 10 of the present invention is thereshown for use with a standard drill motor 12. In the conventional fashion, the drill motor 12 includes a chuck 14 which, upon activation of the drill motor 12, is rotatably driven.

Figure 2:
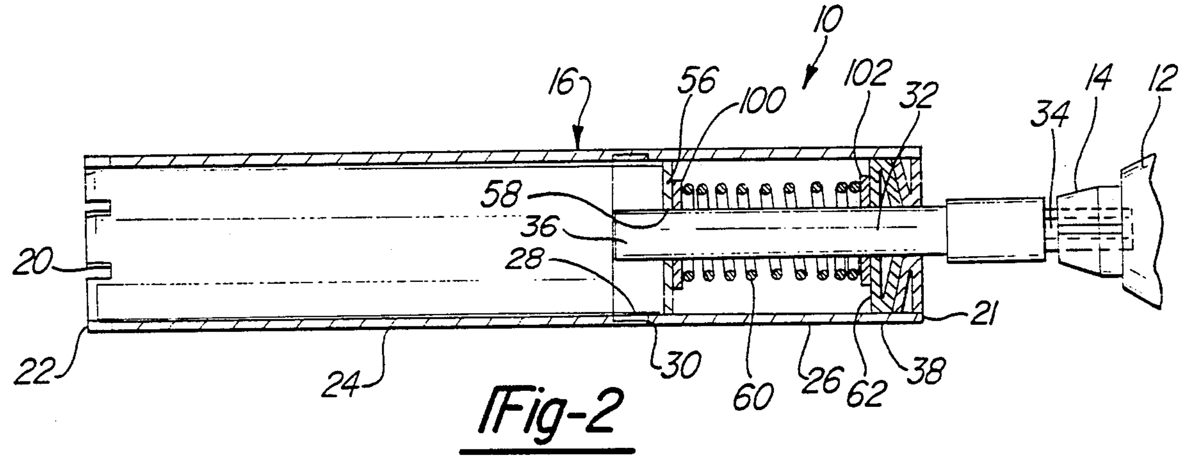
FIG. 2 is a longitudinal sectional view illustrating the preferred embodiment of the present invention with the clutch in the engaged position.

Referring now to FIGS. 1 and 2, the drill assembly 10 of the present invention comprises an elongated tube 16 which has a diameter equal to the diameter of the desired hole in the masonry material 18. At least one cutting member 20 is provided at one end 22 of the tube 16. Preferably, the cutting member 20 comprises a carbide bit.

In the preferred embodiment of the invention, the tube 16 comprises two coaxial sections 24 and 26. However, as shown in the patent drawing, the tube section 26 preferably includes a reduced diameter neck 28 which nests within an end 30 of the tube section 24. The tube sections 24 and 26 are then secured together in any conventional fashion, such as by welding, removable threaded fasteners, or the like.

The drill assembly 10 further includes an elongated rod 32 having one end 34 adapted to be received within the chuck 14 of the drill motor 12. Thus, upon activation of the drill motor 12, the drill motor 12 rotatably drives the rod 32 about its axis.

The other end 36 of the rod 32 is coaxially attached to the tube 16 by a clutch assembly 38 so that the rod 32 extends coaxially outwardly from the end 21 of the tube 16 opposite from the tube end 22. Furthermore, as best shown in FIG. 2, the clutch assembly 38 is preferably contained within the tube section 26.

Figure 3:
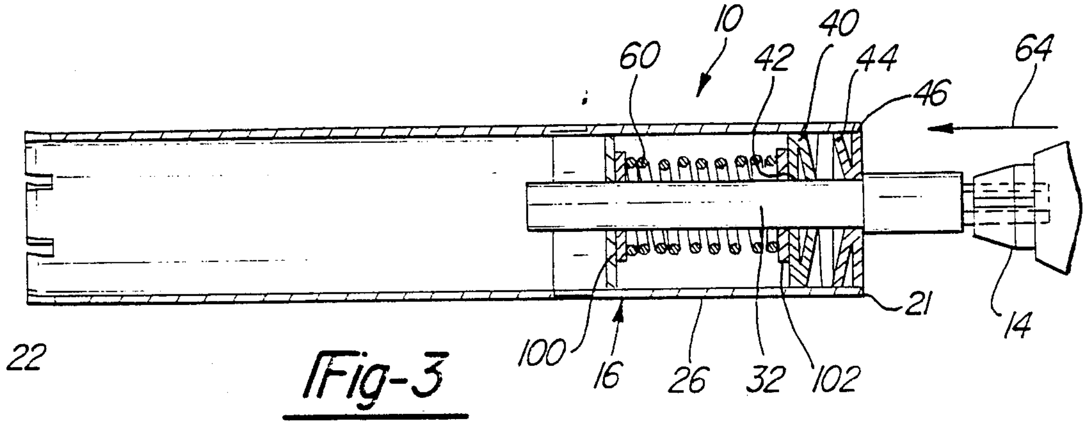
FIG. 3 is a view similar to FIG. 2 but illustrating the clutch assembly in its released position.
Figure 4:
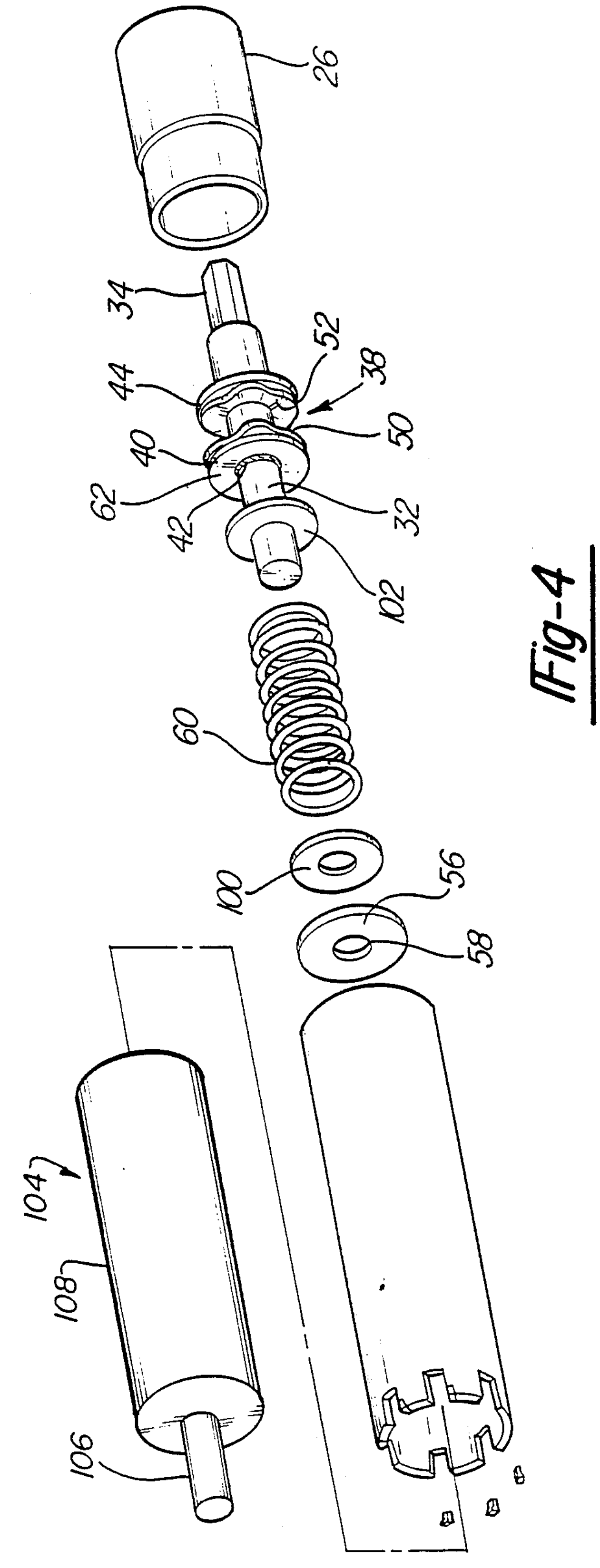
FIG. 4 is an exploded view of the preferred embodiment of the invention.

With reference now to FIGS. 3 and 4, the clutch assembly 38 comprises a first clutch plate 40 which is attached to the rod 32 by any conventional means, such as welds 42. A second clutch plate 44 is coaxially disposed around the rod 32 and is attached to the tube section 26 by welds 46 (FIG. 3).

The clutch plates 40 and 44 are substantially identical to each other and comprise an annular circular plate. As best shown in FIG. 4, a convoluted annular surface having alternating peaks and valleys is provided on the facing surfaces 50 and 52 of the clutch plates 40 and 44, respectively, so that the peaks on one clutch plate 40 nest within the valley on the other clutch plate 44, and vice versa.

Referring now to FIGS. 2 and 4, an annular spring retainer 56 having a central opening 58 is secured to the inner end 36 of the tube section 26 so that the inner end 36 of the rod 32 registers with the opening 58. A helical compression spring 60 in a state of compression is entrapped between the spring retainer 56 and one side 62 of the clutch plate 40. This spring 60 thus urges the clutch plates 40 and 44 together as best shown in FIG. 2.

The clutch assembly 38 is movable between an engaged position, illustrated in FIG. 2, and a released position, illustrated in FIG. 3. In its engaged position, the clutch plates 40 and 44 abut against each other and mechanically couple the rod 32 and tube 16 together. Consequently, with the clutch assembly 38 in its engaged position, the rod 32 and tube 16 rotate in unison with each other.

Conversely, when the clutch plates are moved to their released position, illustrated in FIG. 3, the clutch plates 40 and 44 separate from each other thereby enabling relative rotational movement between the clutch plates 40 and 44. Such a released position would occur, for example, in the event that an axial force in the direction of arrow 64 (FIG. 3) were applied by the operator against the drill accessory 10.

Wear washers 100 and 102 protect the clutch plate 40 and retainer 56 from galling and wear.

In operation, the rod 32 is mounted within the chuck 14 of the drill motor 12 in the conventional fashion.

In order to use the drill assembly 10 of the present invention, a small diameter hole is first drilled into the wall 18 in any conventional fashion, such as with a masonry bit. A wooden plug 104 (FIG. 4) having a reduced diameter portion 106 and a large diameter portion 108 is then inserted into the tube section 24 so that the reduced diameter portion 106 protrudes outwardly from the end 22 of the tube section 26 and so that the large diameter portion 108 of the plug 104 is spaced inwardly from the end 22 of the tube section 26. Furthermore, the plug 104 is dimensioned so that the outside diameter of the large diameter portion 108 is substantially the same as the inside diameter of the tube section 26 while the outside diameter of the small diameter portion 106 of the plug 104 is substantially the same as the diameter of the small hole initially bored into the wall 18.

Thereafter, the plug portion 106 is positioned in the small hole in the wall and the drill motor 12 is activated thereby rotatably driving the tube 16 and cutting the hole in the masonry wall 18.

After the large hole cut by the cutting members 20 has been started, the plug 104 is removed and the large hole is thereafter completed.

It can therefore be seen that the plug 104 serves to guide the drill assembly 10 when starting the hole thereby eliminating "walking" of the drill assembly 10.

In the event that the tube 16 jams during the drilling operation, or in the event that the operator applies excessive force against the masonry wall 18, the clutch assembly 38 disengages so that the drill motor 12 rotatably drives the rod 32 even though the tube 16 is stationary. The clutch assembly 38 thus eliminates the possibility of dangerous kickback of the motor and thereby enables safe operation of the drill assembly 10.

Additionally, if the operator applies excess pressure to the drill attachment, the clutch will release. This protects the diamond, carbide and/or stellate cutting bits from excessive force which otherwise would shorten the life of the bits.

From the foregoing, it can be seen that the present invention provides a simple and inexpensive drill assembly for drilling large holes in masonry walls. Having described my invention, however, many modifications thereto will become apparent to those skilled in the art to which it pertains without deviation from the spirit of the invention as defined by the scope of the appended claims.

I claim:

1. A device for use with a drill motor having a chuck for drilling holes in masonry materials comprising:
- a tube,
- at least one masonry cutting element attached to one end of said tube,
- a rod, said rod being adapted to be received in the chuck of the drill motor and rotatably driven about its axis by the drill motor,
- means for coaxially attaching said rod to said tube so that said rod extends coaxially outwardly from the other end of said tube,
- said attaching means comprising a clutch assembly having an engaged operating position and a released operating position, wherein in said engaged position said rod and said tube rotate in unison with each other while in said released position, said clutch assembly permits relative rotational movement between said rod and said tube.

2. The invention as defined in claim 1 wherein said clutch assembly comprises a pair of clutch plates, one clutch plate being secured to said rod, the other clutch plate being secured to said tube, and means for urging said clutch plates together.

3. The invention as defined in claim 2 wherein said urging means comprises a helical spring.

4. The invention as defined in claim 2 wherein each clutch plate is generally circular in shape and has a convoluted annular surface with alternating peaks and valleys, said annular surfaces being dimensioned so that the peaks on each clutch plate rest within the valleys on the other clutch plate.

5. The invention as defined in claim 1 wherein said cutting element comprises a carbide bit.

6. The invention as defined in claim 4 wherein said clutch plates are arranged so that the clutch plate attached to the rod is positioned closer to said one end of said tube than the other clutch plate so that sufficient axial force applied to said rod separates said clutch plates and moves said clutch assembly to said released condition.

7. The invention as defined in claim 1 and further comprising a plug having a large diameter portion and a small diameter portion, said large diameter portion having an outside diameter substantially the same as an inside diameter of said tube, said plug being insertable into said tube so that said small diameter portion of said plug protrudes outwardly from an end of said tube and so that said large diameter portion is spaced inwardly from said end of said tube.

* * * * *